US006804257B1

United States Patent
Benayoun et al.

(10) Patent No.: US 6,804,257 B1
(45) Date of Patent: Oct. 12, 2004

(54) SYSTEM AND METHOD FOR FRAMING AND PROTECTING VARIABLE-LENGHT PACKET STREAMS

(75) Inventors: Alain Benayoun, Cagnes sur Mer (FR); Patrick Michel, La Gaude (FR); Jean-Francois Le Pennec, Nice (FR); Gilles Toubol, Villeneuve Loubet (FR)

(73) Assignee: International Business Machines Corporation, Armonk, NY (US)

( * ) Notice: Subject to any disclaimer, the term of this patent is extended or adjusted under 35 U.S.C. 154(b) by 899 days.

(21) Appl. No.: 09/664,931

(22) Filed: Sep. 19, 2000

(30) Foreign Application Priority Data

Nov. 25, 1999 (EP) .............................. 99480120

(51) Int. Cl.[7] .................................. H04J 3/24
(52) U.S. Cl. ..................... 370/471; 370/474; 370/476; 370/503; 375/364; 375/365; 375/371
(58) Field of Search ................. 370/352, 389, 370/392, 395.1, 397, 503–520, 474, 476, 471, 229; 375/364, 365, 368, 371

(56) References Cited

U.S. PATENT DOCUMENTS 5,898,695 A * 4/1999 Fujii et al. .................. 370/464

6,400,720 B1 * 6/2002 Ovadia et al. ......... 370/395.64
6,522,665 B1 * 2/2003 Suzuki et al. ................ 370/471
6,622,278 B1 * 9/2003 Morgan et al. ............. 714/758

* cited by examiner

Primary Examiner—Steven Nguyen
Assistant Examiner—Roberta Stevens
(74) Attorney, Agent, or Firm—Daniel E. McConnell; John R. Piynichny; Dillon & Yudell LLP (57) ABSTRACT

A method and a system for framing variable-length packets in a data communications system are disclosed. The successive variable-length packets carrying users' data, are formed in a stream of chained packets comprising a header. Two CRC's are computed. One over the data and another one over the header however, including also the data CRC of the immediate previous packet, thus chaining successive packets in a steam of such packets. The invention also assumes that encryption is performed independently over header and corresponding CRC's and, on the other hand, over the data of current packet. The invention allows to better adapt the transportation of multi-media users' data in packets of variable-lengths while securing transport by chaining successive packets, thus preventing that accidental or malicious deletion and insertion of packets occur and remain undetected. Also, the invention permits that intermediate transport nodes, owning keys to decrypt headers, may perform packet add/drop multiplexing without requiring that users' data need to be decrypted on their way to their final destination.

14 Claims, 6 Drawing Sheets

RECEIVE DEVICE

Figure 6

SYSTEM AND METHOD FOR FRAMING AND PROTECTING VARIABLE-LENGHT PACKET STREAMS

BACKGROUND OF THE INVENTION

1. Field of the Invention

The present invention relates generally to the field of data communications, and more particularly applies to a system and method for framing variable-length packets, which also provides for their protection in a stream of such packets.

2. Description of the Related Art

For decades, data processing applications mainly stored information in alphanumeric form. It was only at the beginning of the 1990s that processor performance and the sharp drop in prices for mass storage made it possible to run multimedia applications on computer systems. Information is now increasingly held in a mix of still images, video, text, and sound/speech databases. Additionally, these new information technologies are used for interactive communication. Satisfying these requirements not only calls for networks having significant transmission bandwidth; it also requires that an adequate transport mechanism be put in place that is flexible enough to allow the transmission, over the same medium, for example, of digitally coded voice on one hand and large quantities of raw data representing a still image on the other hand. The former, which has low bandwidth requirements, ideally needs that small chunks of data transferred, at regular intervals, be transported to a remote location with a delay that should not exceed a few tenths of milliseconds to permit that a conversation may comfortably take place between two distant interlocutors. On the contrary, the latter would require that very large chunks of data be transferred together to limit the overhead that necessarily results from the fragmentation of a large data file in packets, the delay in that case being a far less important criterion.

Thus, broadband ISDN (Integrated Services Digital Network) was an attempt to set up a single, unified, worldwide, and high-speed network in place of the multiplicity of existing networks for different applications. The new, universal network was intended to be able to take over, on one hand, the functions of current speech, data and television networks and, on the other hand, to provide enough scope for the implementation of future communications technologies. The first work on standards for this universal network of the future was begun by CCITT (International Telegraph and Telephone Consultative Committee) in the late 80's, under the heading of B-ISDN. It is based on ATM (Asynchronous Transfer Mode), which is a data transmission technique belonging to the family of cell switched systems (cell relay). An ATM cell is a small (53 bytes, including a 5-byte header and a 48-byte payload) fixed-size packet. The fixed length of 53 bytes for a cell is therefore the result of a compromise between the demands of analog speech transfer and digital data transmission. In digital transfer of analog speech signals, the speech is sampled 8000 times a second and each sampled value is transmitted as an eight-bit code. This means that 64 kbits/sec have to be carried by each speech channel and result in a cell being sent only every 6.6 ms and, possibly, at a much lower rate if compression techniques are applied at the source to save bandwidth. While it would be best to have as short a cell as possible for pure analog speech transfer, on the other hand, with 9.4% of overhead, a 53 byte packet size is not very well suited for economical transmission of pure data streams. These typically require that segmentation at source and re-assembly at destination be carried out to restore data files and messages. Thus, as a compromise, ATM is neither completely satisfactory for the transmission of voice nor of data.

Another key aspect of today's data communications deals with security and integrity of the transmissions. Security is well handled at application level with encryption techniques, e.g. DES (Data Encryption System), an international standard based on a symmetric algorithm using the same key for encryption and decryption while authentication is carried out by adding a signature or message digest to the transmitted data so as to be sure of its origin and content. A well-known example of this is the MD5 (Message Digest Algorithm version 5) subject of the IETF (Internet Engineering Task Force) RFC (Request For Comment) 1321. At transport level data integrity is generally insured by the use of CRCs (Cyclic Redundancy Checking), which consists of adding to a transmitted message or data entity i.e, a packet, an FCS (Field Check Sequence) so that the receiving end can check that it has not been altered on its way. However, this was intended mainly for the detection of hardware and software malfunctions or of errors occurring on transmission lines and, because this is done on a per packet basis, it cannot detect unwanted insertion or complete dropping of packets be it done accidentally or maliciously, e.g. with 'cut and paste' techniques. Although this may possibly end up to be finally detected by a higher level protocol at destination end, this does not help in pinpointing the source of the problem when data were transported. With the exponential increase of the amount of data exchanged over diverse and complex communications networks, sometimes spanning over large or very large geographic distances through numerous nodes and transport media, there is also a need to improve this aspect in the transmission of multimedia sources of data.

SUMMARY OF THE INVENTION

Thus, it is a broad object of the present invention to propose a variable-length packet framing technique to better adapt the transportation medium to the various sources of data encountered in a multimedia environment.

It is another object of the invention to permit that data streams, composed of those variable-length packets, be secured so that no packet can be wrongly inserted or dropped when transported without being immediately detectable.

It is still another object of the invention that adding and dropping of packets in authorized intermediate transport nodes, along with their routing, be carried out without having to decrypt user data so that end to end security of transported data is insured.

It is yet another advantage of the invention to permit that CRCs, already present in many protocols to check packet content, be also useable for framing the variable-length packets.

Further advantages of the present invention will become apparent to the ones skilled in the art upon examination of the drawings and detailed description. It is intended that any additional advantages be incorporated herein.

A method and a system for framing variable-length packets in a data communications system are disclosed. The successive variable-length packets, aimed at transporting users' data, are formed in a stream of chained packets. When having to frame an $n^{th}$ packet of the stream of packets, a first CRC is computed over the data to be transported by this $n^{th}$ packet. Then, a header is prepared including at least a data length field. After which a second CRC is computed encompassing the header of the $n^{th}$ packet and the first CRC of the immediate previous $(n-1^{th})$ framed packet. This is followed by the concatenation of the header with the second CRC, the data and the first CRC so that the $n^{th}$ packet is thus framed and chained into the stream of chained packets. The first CRC of current $(n^{th})$ packet is temporarily remembered so that framing and chaining of the immediate subsequent $(n+1^{th})$ packet can then take place. This repeats for every variable-length packet to be framed.

The method and system of the invention also assume that encryption is performed independently, on one hand, over the first CRC of $n-1^{th}$ packet along with the header and the second CRC of the $n^{th}$ packet and, on the other hand, over the data of $n^{th}$ packet.

Therefore, the invention, which allows better adaptation of the transportation of multi-media users' data in packets of variable-lengths, also secures it by chaining successive packets, thus preventing that accidental or malicious deletion and insertion of packets be carried out and remain undetected. Also, the invention permits that intermediate transport nodes, duly authorized i.e., owning keys to decrypt headers, may perform packet add/drop multiplexing without requiring that users' data be decrypted on their way to their final destination.

BRIEF DESCRIPTION OF THE DRAWINGS

Further advantages of the present invention will become apparent to the ones skilled in the art upon examination of the drawings and detailed description, wherein.

DETAILED DESCRIPTION OF THE PREFERRED EMBODIMENT

Figure 1:
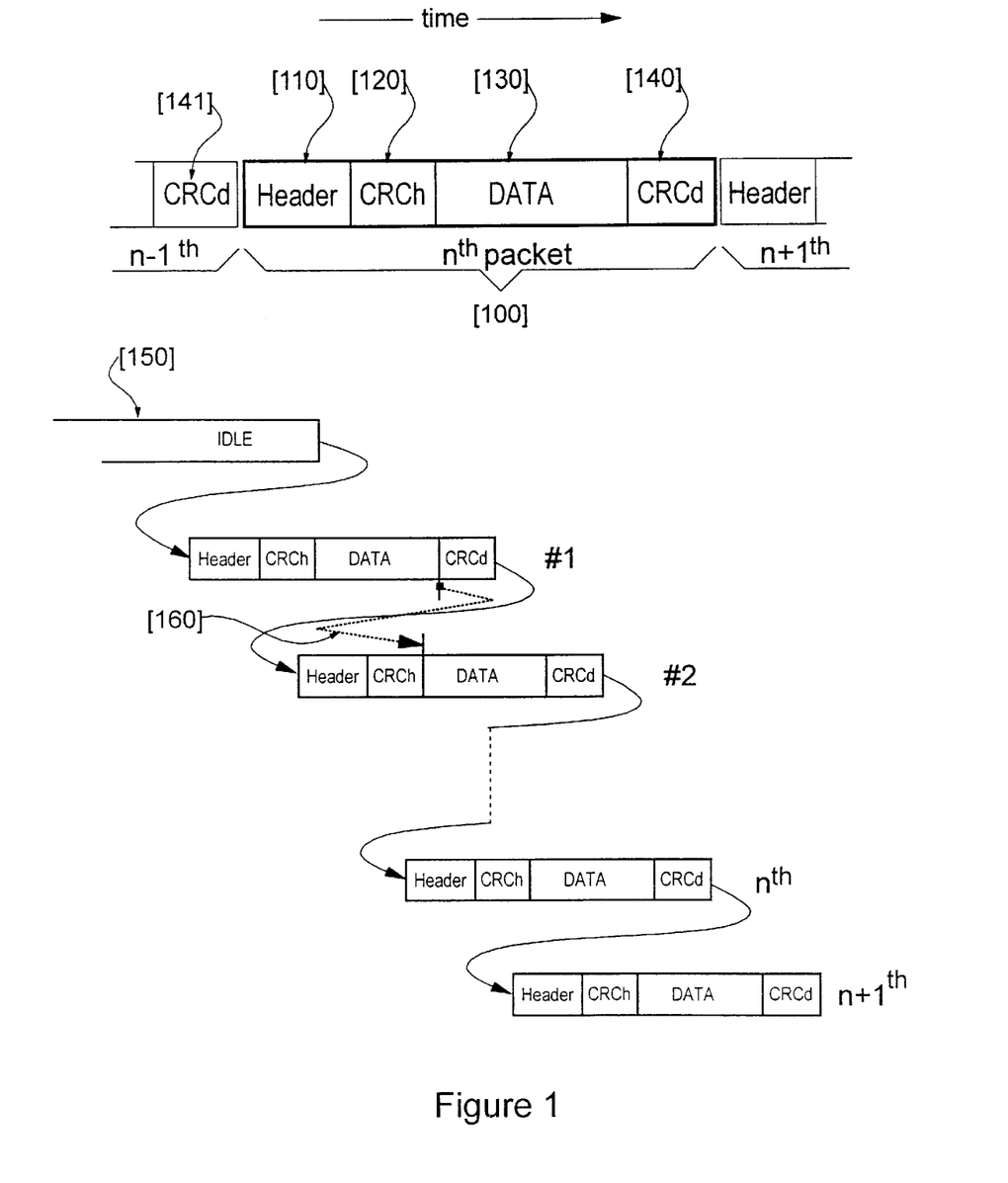
FIG. 1 describes the structure of a packet per the invention and the chaining of a stream of such packets.

FIG. 1 describes the basic packet structure 100 per the invention. It contains 4 fields:

A header field 110 which will be described with more details in FIG. 3 herein after.

A CRC 120 of the header field 110, referred to as CRCh in the following, whose specific calculation method is further described hereafter.

A data field 130 which contains users' data. This includes all the overhead of the upper layers protocols (e.g., Frame Relay) utilized by the users to handle their data.

A CRC 140 of the data field 130, referred to as CRCd in the rest of the document. Very often, a CRC is already included as a trailer in the upper layer protocols previously mentioned. Thus, there is no need to duplicate it. The CRC of the user protocol can be used or replaced instead by the one of the invention, in which case the user protocol CRC is preferably regenerated at destination.

Thus, what is specific in the packet structure 100 per the invention is that two CRC's 120 140 are present and that CRCh(n) i.e., CRC of the $n^{th}$ packet header, includes in its calculation the value of the previous data field CRC. That is, it includes CRCd(n−1) as shown e.g., in 160 between first packet and second packet. This implies that successive packets are linked, encompassing three CRCs namely, CRCd(n−1), CRCh(n) and CRDd(n). A flow of such packets may start after two pieces of communication equipment have indeed been able to set a communication over a line resulting in the exchange of some form of IDLE pattern 150 which depends on the type of communication and protocol in use. This IDLE pattern could be advantageously the SYNCHRO header described in FIG. 3 hereafter. It is then followed by a sequence of packets using the above packet format 100, although this is optionally preceded by an INIT sequence described in FIG. 4. Because CRC header 120 calculation is performed on all bytes of the header 110 plus the bytes of the CRC data field of the previous packet 141, this prevents insertion of bogus packets in the flow without violation of flow integrity. And since CRCd 140 is computed from all data bytes 130, an even better protection is obtained if this latter field is encrypted so that CRCd can match only after data is decrypted (i.e., CRCd calculation is performed before encryption). In that case; there is no need for intermediate nodes to decrypt or check it. Only encryption end points have to validate data with the corresponding CRCd.

Figure 2:
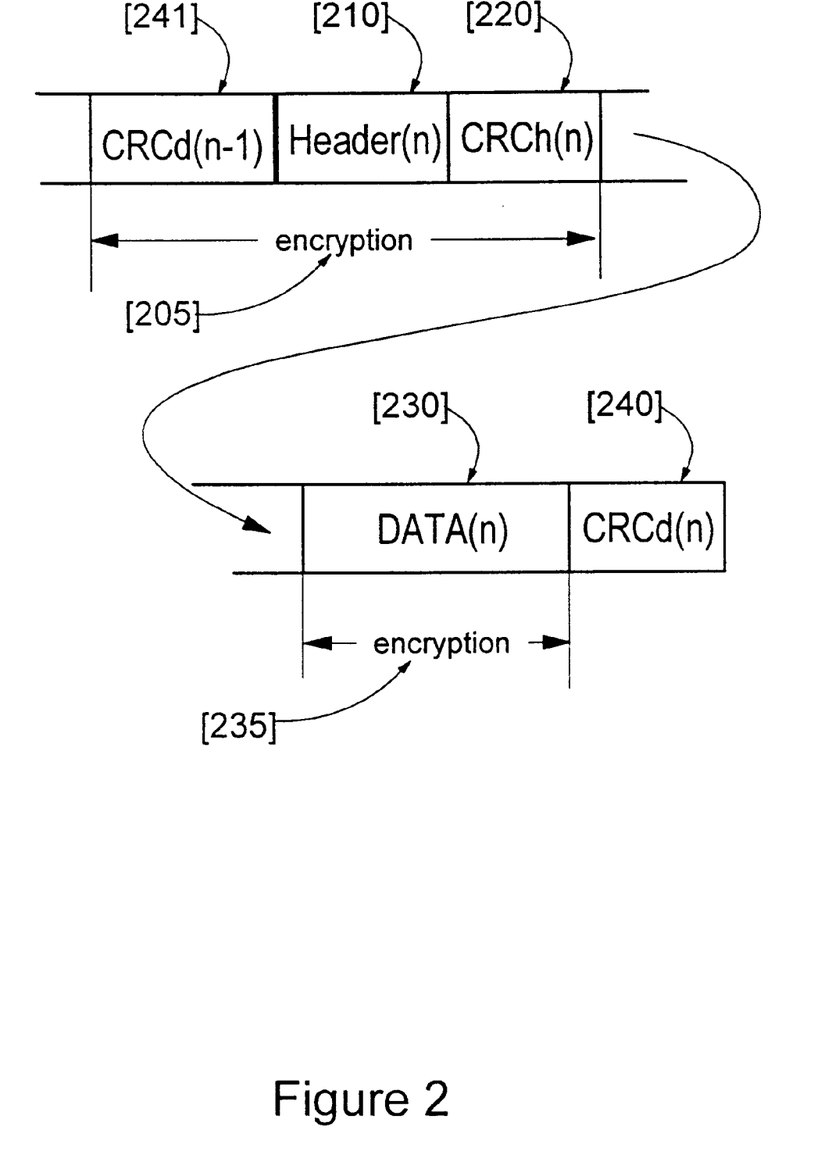
FIG. 2 shows what parts of packets are independently encrypted.

FIG. 2 discusses the encryption schemes combined with the framing per the invention. In a preferred embodiment, encryption 205 of the header 210 including header CRC i.e., CRCh(n), 220 plus the data CRC of previous packet CRCd (n−1) 241 is performed in order to mask the chaining of the flow. This prevents all sorts of packet mishandling such as insertion, deletion or packet header modifications from becoming undetectable as in standard framing methods. In addition, an encryption 235 of the data field 230 may be performed independently of the header encryption in order to secure the data part of the packet (CRDd is computed over plain data before encryption is performed). This latter encryption, which excludes CRCd 240, is thus not linked to the other one, which encompasses CRCd(n−1), Header(n), and CRCh(n). Data encryption is done end to end while header encryption is performed in the network nodes where traffic merging is required and explicitly authorized. Because this encryption on header is implemented on a reduced number of bytes, as compared to the number of bytes of an average packet, limited resources are needed to carry out this function in the authorized nodes. Therefore, performing a differentiated encryption of header and data with some overlapping permits greatly enhanced security of the transmission while preserving the possibility of performing add/drop multiplexing in authorized intermediate transport nodes without having to decrypt user's encrypted data on their way to their final destination.

Figure 3:
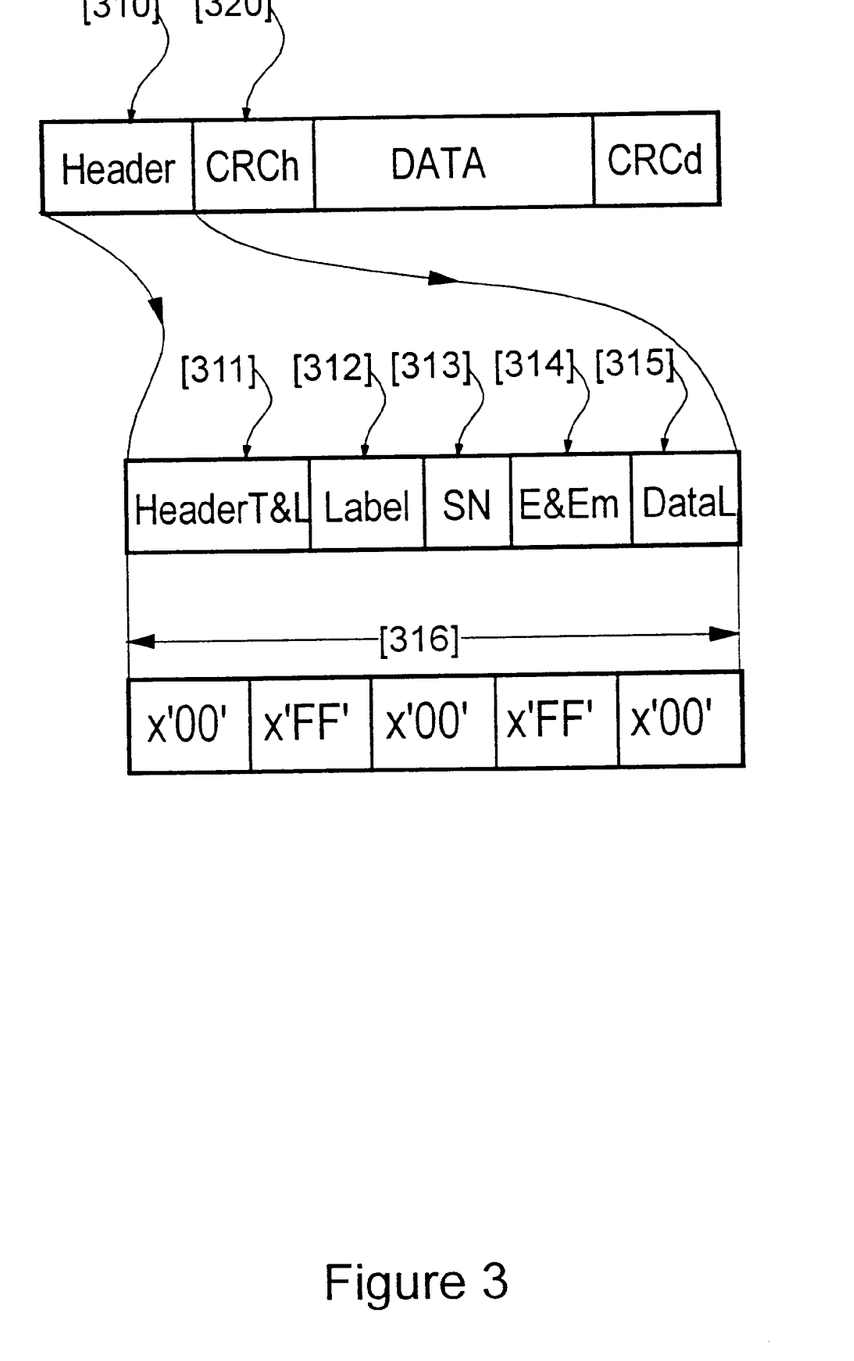
FIG. 3 is a closer view of the header structure that also shows the special synchronization header.

FIG. 3 focuses on packet header format and values. The packet header is comprised of following sub-fields:

A header type and length field 'HeaderT&L' 311.

A label field 'Label' 312.

A sequence number field 'SN' 313.

An error detection and encryption method field (E&Em) 314.

A data length field 'DataL' 315.

Header Type and Length field 311: The 2 first bits of this field defined the header type such as b'00', in binary notation, for synchronization (see hereafter synchro header 316), b'01' for data, b'10' for the first starting header and b'11' being reserved for indicating additional starting headers that will define the CRC checking method of the header field by label or group of labels. The remaining bits, a 6-bit subfield in the preferred embodiment, indicate the number of bytes that are inserted in the header, up to the CRCh field 320 that ends it, providing for a 64-byte header if this is indeed a 6-bit subfield. Note that synchro headers and starting headers must never be encrypted for obvious reasons. The encryption may only commence after the last starting header has been sent out. Label field 312: It is used to differentiate flows and associated classes of services. The first starting header defines the length and general structure of this label that may contain such subfields as 'Flow ID' and 'Class of Service'. The following or inserted starting packet may define more precisely each label or set of labels, using also the data field. Optionally, an alternate channel may also be used to agree on the definition and use of this field.

Sequence Number field 313: As the name suggests, it identifies a packet in a flow of such packets. It allows detection of, after an error checking of CRCh 320 has been performed, packet insertion or deletion in the flow.

The Error Detection and Encryption Method field 314 is preferably an 8-bit field. It carries on the first 2 bits an indication of which algorithm is actually in use for computing CRCh of header 320 (thus, possibly among 4 types). The next 2 bits carry a similar type of information for CRCd i.e., CRC of data field previously discussed. The algorithm used for data need not be known in the network but only at the end points. The remaining 4 bits are then used to indicate the encryption method of the data field. A zero value indicates that data field is not encrypted. An x'F' value indicates that end points have to negotiate the encryption method to use through a separate communication channel. These four bits of E&Em field 314, when in a starting header, indicate which encryption method is used for the header CRC. This information is no longer sent in following standard packets (i.e, packets carrying users' data) since the decryption method and protocol of the header should be known and done prior to looking at the header. This is the main objective of the first starting header. Additional starting headers may be used to establish an SA (Security Association) in a secure node that however, does not rely on this protocol for setting its own security association used to protect data packets. As this indication is sent unencrypted, it is always possible to agree between associated nodes on the encryption method and protocol to use through an alternate channel. In that case this field is set to x'F' and starting header(s) are optional. When the synchro is lost, if there is no change in the transmission configuration, there is no need to send starting headers either and data transmission can start directly using regular numbered sequences.

Data Length field 315: It indicates what is the overall number of data bytes of the packet.

Synchronization header 316: This is a very specific header whose hexadecimal value is x'00FF00FF00'. Each sub-field is exactly one-byte long. This synchro header is neither followed by any data field nor by any corresponding data CRC field. The adapter keeps sending this pattern when the byte synchro is lost. This particular sequence is checked permanently in receive. Synchro sequence header is also used whenever an adapter is initialized or wants to change some of the basic settings previously discussed.

Figure 4:
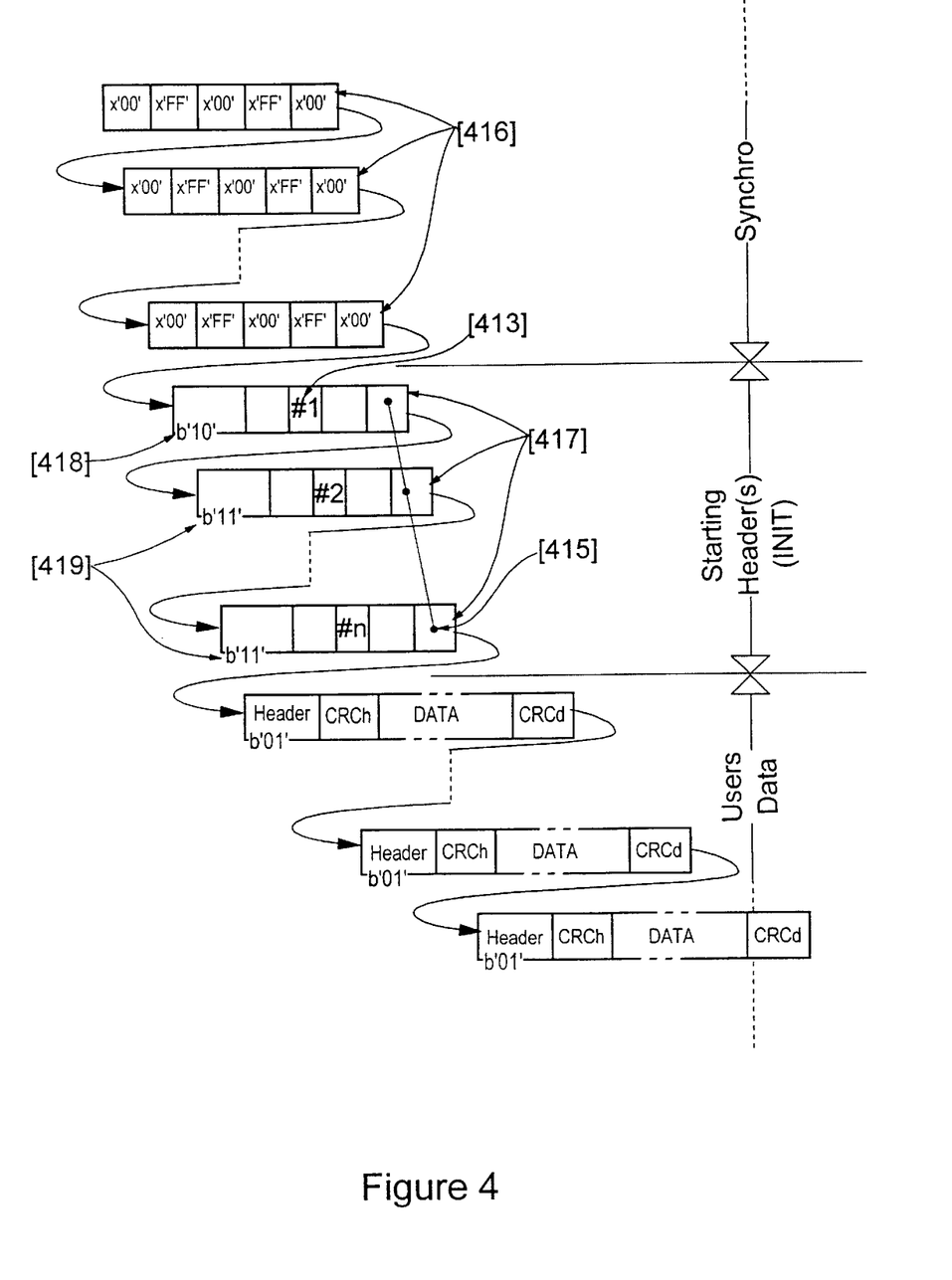
FIG. 4 depicts a typical initialization sequence starting with synchronization headers, followed by starting headers and regular variable-length packets carrying users' data.

FIG. 4 describes a full initialization sequence, which starts with a series of synchro headers 416 in order to get the byte synchronization, and is then followed either by one or several starting headers 417. All are sent in the clear i.e., not encrypted. The synchro headers are recognized thanks to their specific value of x'00FF00FF00' and header type (i.e., the 2 leading bits) of b'00'. The first starting header has a header type of b'10' 418. Next starting headers (if any) have a header type of b'11' 419. Starting headers are aimed at defining the characteristics of the flow through the assignment and definition of the header's 'Label' field in order to carry out sophisticated functions such as 'Quality of Service' while the use of the 'Label' field may be also simply limited to indicate e.g., what type of data is actually transported. Starting or INIT headers 417, which have the same structure as the regular packet headers described in FIG. 3, may optionally be followed by a data field. This is recognized by examining header 'DataL' field 415 which indicates whether a data field is present or not and the length of this data field. Sequence number or 'SN' field 413 of the first starting header is set to one. Subsequent packets, either additional starting packets or regular data packets, increment the 'SN' field. Therefore, different settings may be achieved for different flows. Additional data after the starting header may define the label field or a suite of labels that may be used to associate definition of a flow, which are then applied to packets having an identical label field (or match a subfield in the label). All listed labels thus have the same length and the same CRC definition. This allows enablement of various settings that match characteristics of incoming flows. Not all label field bits are necessarily used. This may be limited to a few bits, in which case the label field within the header defines the number of bits used for that grouping of flows having identical header management characteristics. In that case labels use two sub-fields, one subfield indicates to which group they belong and another sub-field is used as a unique identifier within the group. All labels in a group have the same definition, at least for CRC calculation. They may have the same QoS.

The scheme of the invention is flexible enough to permit however, during normal transmission, even though no synchro error is observed, insertion of synchro headers (header type b'00') and/or starting header packets (header types b'01' or b'11'). The former can be used instead of an IDLE pattern discussed in FIG. 1 150 to speed up the synchronization while the latter may be used to reconfigure the flow characteristics or re-assign labels. Alternatively, it may also be used as a control channel.

Figure 5:
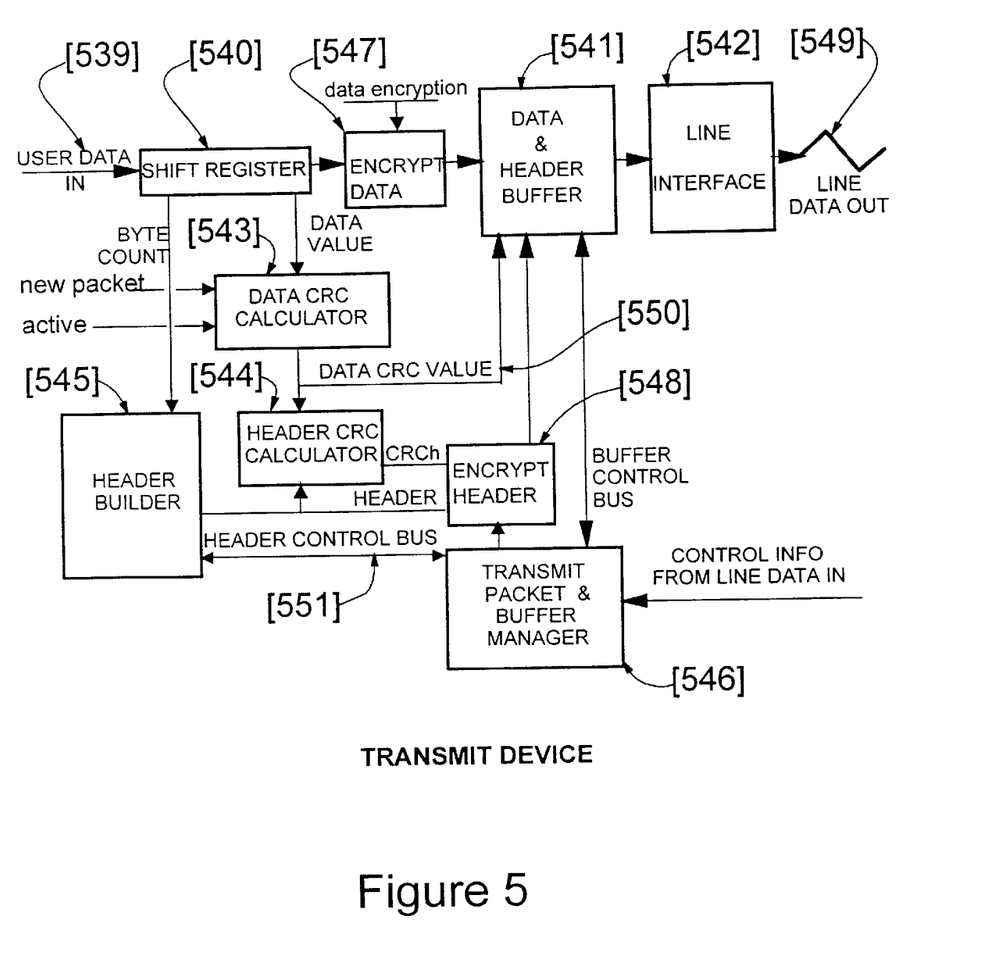
FIG. 5 is an example of a transmit device that would allow a user to carry out the method of the invention.

FIG. 5 is an example of a transmit device to carry out the invention. Incoming data i.e., 'USER DATA IN' 539, to be eventually transmitted over a communications line 549, received through an entry port or arriving through a trunk to a node comprising a transmit device of the kind shown in this figure, first enters a 'SHIFT REGISTER' 540 before being stored in a 'DATA & HEADER BUFFER' 541. Encryption on incoming data is optionally performed in 'DATA ENCRYPTER' 547 if 'data encryption' line is active. Simultaneously, data are sent from 'SHIFT REGISTER' 540 to a 'DATA CRC CALCULATOR' 543. This can be performed e.g., on a per byte or a per word basis depending upon what CRC calculator is in use. Whenever a new data field is received, a 'new packet' signal is asserted. This has the effect of resetting the current CRC calculation while inserting the data CRC value 550, just calculated over the current data, into the corresponding CRCd field shown in FIG. 1 140. This is stored, along with the data, into the 'DATA & HEADER BUFFER' 541. CRC calculation is effectively performed when the 'active' line of 'DATA CRC CALCULATOR' 543 is set. Otherwise the last data bytes (whichever number of bytes or bits corresponding to the CRCd length utilized) are used in lieu of a real CRCd value. This CRCd value is input into a 'HEADER CRC CALCULATOR' 544 in order to calculate the header CRC of FIG. 1 120.

In the meantime a byte count of data bytes stored in 'SHIFT REGISTER' 540 is performed to be taken into account by a 'HEADER BUILDER' 545 including a counter. This circuit is also aware of the content of the other header fields set by a 'TRANSMIT PACKET & BUFFER MANAGER' 546 through a header control bus 551. The Header (i.e., field 110 in FIG. 1) plus the CRCh header (i.e., 120 in FIG. 1), are then optionally encrypted in a 'HEADER ENCRYPTER' 548. Finally, an entire packet is formatted in buffer 541 that is sent to a 'LINE INTERFACE' 542 when ready. This latter item encapsulates the packet in a lower layer protocol aimed at transporting the packet over a communications line 549. In addition, 'TRANSMIT PACKET & BUFFER MANAGER' 546 may receive messages from a remote node through a control info message included in the data field of packets having a starting header (header type b'11'). This can be used to request that synchro headers or new starting headers, as depicted on FIG. 4, be forwarded for redefining some configuration parameters. In that case 'TRANSMIT PACKET & BUFFER MANAGER' 546 builds the corresponding packet or set of packets in 'DATA & HEADER BUFFER' 541 for being transmitted to the remote node.

It is worth noting here that two different utilizations of a transmit device must be considered. A first case corresponds to the fact that incoming data 539 are received unencrypted with CRCd not calculated. This is generally the situation encountered in a first access node (i.e., a port) to a network and data processing is the process described previously. The second case corresponds to intermediate nodes (data are received through a trunk) and where data fields and associated CRCd's have been already calculated in an upstream node. Then, in this case, no further CRCd calculation or data encryption is performed.

Also, it should be mentioned that it is always possible to send data directly from an end device, encrypted or not, including, or not, a CRC at the end of the packet. Especially, when encryption and CRC calculation have already been done at entry in the first network device, no encryption or CRCd calculation are further required on the transmit interface. Even if there was no real CRCd calculation performed, the trailing bits of the incoming data are used as if they were an actual CRCd field in order to perform the packet chaining. The header 'E&Em' field of the packet then reflects that current data are encrypted and that CRCd checking has not to be performed at the egress port because e.g., it is handled by a higher protocol layer on another device which may be the true final destination device.

Figure 6:
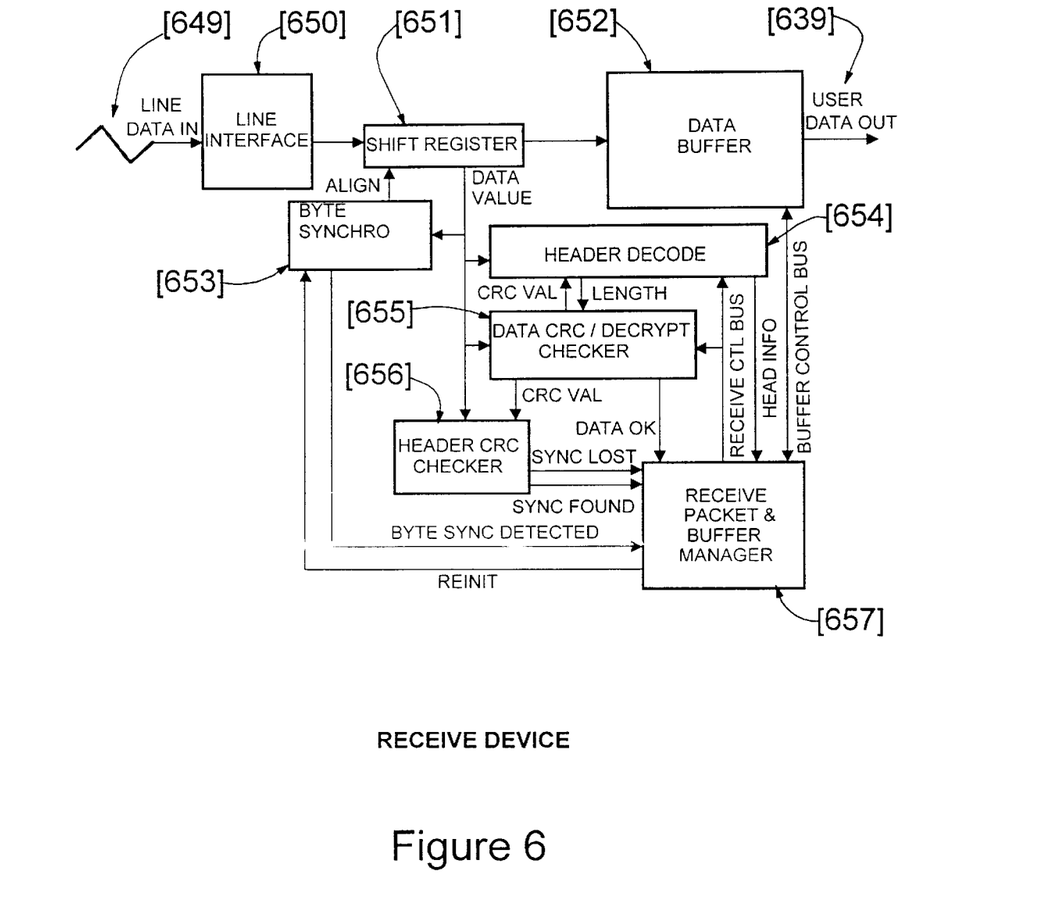
FIG. 6 is an example of a receive device counterpart of the previously referenced transmit device.

FIG. 6 illustrates an example of a receive device, counterpart of the transmit device discussed in FIG. 5, aimed at implementing the scheme of the invention. Data is received from a communications line 649 through a 'LINE INTERFACE' circuitry 650, which strips off all the overhead of lower level protocols, before entering them into a 'SHIFT REGISTER' 651 in order to perform a serial to parallel conversion if not already done directly in 650. Whichever place this conversion takes place, block 651 is assumed to be capable of counting the number of incoming bytes. It must also be able, among other things, to help in recovering packet synchronization. That is, the synchro header (see 316 in FIG. 3) is looked for during the synchronization phase discussed in FIG. 3. When found, 'BYTE SYNCHRO' 653 is asserting a 'BYTE SYNC DETECTED' signal to a 'RECEIVE PACKET & BUFFER MANAGER' 657 and, simultaneously, asserts an 'ALIGN' signal to 'SHIFT REGISTER' 651 so that this latter knows what sort of bit shifts must be accommodated to correctly receive data.

'Header CRC checker' 656 is in charge of checking CRC header (i.e., CRCh 320 of FIG. 3). It is enabled when 'CRC VAL' signal from 'DATA CRC/DECRYPT CHECKER' 655 is asserted i.e., when the position of the CRCd field has been identified after having counted the number of bytes of the data field. 'CRC VAL' is also sent to HEADER DECODE block 654.

'HEADER DECODE' 654 analyzes each field of the header (i.e., 311 to 315 of FIG. 3) decoding e.g., data length ('DataL') to be used in 655 and, possibly, the CRC type and the encryption method to be used. Other decoded characteristics of the packet are provided to 'RECEIVE PACKET & BUFFER MANAGER' 657 over the 'HEAD INFO' bus or line.

Checking of the header CRCh field is performed simultaneous to the byte per byte reception of data. It starts when 'CRC VAL' line, from block 655, is asserted, which corresponds to the occurrence of a new packet. It uses checking instructions given by 'RECEIVE PACKET & BUFFER MANAGER' 657 and placed on the 'receive ctl bus' in order to configure 'header decode' 654 and 'DATA/CRC DECRYPT Checker' 655 so that they adapt to the type of CRC in use and handle encryption if any. CRC checking is done with or without a prior decryption step, depending on the type of initialization performed through 'receive ctl bus'. It applies to all packets within a flow that use the same configuration. Different flows may be defined using other CRCs and parameters. If the CRC checking is bad, a 'sync lost' line is asserted informing 'RECEIVE PACKET & BUFFER MANAGER' 657 of the error. This may be due either to corrupted or bad data or a desynchronization. Then, 'HEADER CRC CHECKER' 656 enters a discovery mode in search of another sequence giving a good CRC. When done, 'SYNC FOUND' line is activated and process may go on.

A 'RECEIVE PACKET & BUFFER MANAGER' 657 watches 'SYNC FOUND' and 'SYNC LOST' lines, counting and managing the losses of synchronization in order to ask the remote node to perform a transmission of synchro headers to recover it whenever it is necessary. To this end, the remote node inserts synchro headers on its transmission line followed by at least two starting headers, the first one having x'FF' as serial number ('SN' sub-field of header) and the second x'00'. The remote node, monitoring 'SN' values through 'header decode' 654, is able to identify a request for synchronization and thus, answers with a set of synchro headers followed by a first starting header having x'00' in SN field. This prevents from having to have a loop in requesting synchro header to be sent to the other side.

When data stored in 'DATA BUFFER' 652 is validated, the 'RECEIVE PACKET & BUFFER MANAGER' 657 permits that data be placed on the 'USER DATA OUT' 639 interface for further processing under the control of a 'buffer control' bus. Otherwise either data is discarded and an error is logged on or data is sent with a bad CRC in order to make the final destination aware of a transmission error.

As with the transmit device two different uses of a receive device must be considered, depending on if incoming data is received, from an upstream transmit node, unencrypted with CRCd not calculated or not. All of this is defined in the packet header and corresponding decryption and/or CRCd checking may be activated accordingly in DATA CRC/DECRYPT block 655. Intermediate nodes on the path don't have to calculate CRCd nor decrypt data. For each packet, the label value may be used to identify if the current node is an intermediate or an egress node in which the functions of block 655 have to be activated or not.

What is claimed is:

1. A method for framing variable-length packets in a data communications system, wherein successive said variable-length packets, aimed at transporting users data, are formed in a steam of chained packets upon having to frame an $n^{th}$ packet of said stream of packets, said method comprising:

computing a first CRC 'CRCd' over said data to be transported in said $n^{th}$ packet;

preparing a header for said $n^{th}$ packet, wherein said header includes a data length field 'Data', a header type and length field 'HeaderT&L', a label field 'Label', a sequence number field 'SN', and an error detection and encryption method field 'B&Em';

computing a second CRC 'CRCh' encompassing said header of said $n^{th}$ packet and said first CRC of the immediate previous $(n-1^{th})$ framed packet;

concatenating said header, said second CRC, said data and said first CRC, thereby framing and chaining said $n^{th}$ packet to said stream of chained packets;

temporarily remembering said first CRC for further framing of an immediate subsequent $(n+1^{th})$ packet; and repeating all above-mentioned steps for every variable-length packet to be framed.

2. The method of claim 1 further comprising encrypting said first CRC of $n-1^{th}$ packet along with said header and said second CRC of $n^{th}$ packet.

3. The method of claim 1 further comprising encrypting said data of $n^{th}$ packet.

4. The method of claim 1 further comprising forwarding synchronization headers in lieu of said variable-length packets for the purpose of acquiring or recovering synchronization.

5. The method of claim 1 further comprising forwarding starting headers it lieu of said synchronization headers or in lieu of said variable-length packets for the purpose of setting or changing operational parameters.

6. The method of claim 1, wherein said computing a second CRC is replaced by computing a second CRC 'CRCh' encompassing said header of said $n^{th}$ packet and enough trailing bits of what is preceding said $n^{th}$ packet to spoof preceding said first CRC if said first CRC is not provided.

7. The method of claim 1, wherein computing a first CRC is replaced by re-using any CRC belonging to protocols transported by said users' data.

8. A data communication system for framing variable-length packets, wherein successive variable-length packets, aimed at transporting users data, are formed in a stream of chained packets upon having to frame an $n^{th}$ packet of said stream of packets, said data communication system comprising:

means for computing a first CRC "CRCd' over said data to be transported in said $n^{th}$ packet;

means for preparing a header for said $n^{th}$ packet, wherein said header includes a data length field 'DataL', a header type and length field 'HeaderT&L', a label field 'Label', a sequence number field 'SN', and an error detection and encryption method field 'E&Em';

means for computing a second CRC 'CRCh' encompassing said header of said $n^{th}$ packet and said first CRC of the immediate previous $(n-1^{th})$ framed packet;

means for concatenating said header, said second CRC, said data and said first CRC thereby, framing and chaining said $n^{th}$ packet to said stream of chained packets;

means for temporarily remembering said first CRC for further framing of an immediate subsequent $(n+1^{th})$ packet.

9. The data communication system of claim 8 further comprising means for encrypting said first CRC of $n-1^{th}$ packet along with said header and said second CRC of $n^{th}$ packet.

10. The data communication system of claim 8 further comprising means for encrypting said data of $n^{th}$ packet.

11. The data communication system of claim 8 further comprising means for forwarding synchronization headers in lieu of said variable-length packets for the purpose of acquiring or recovering synchronization.

12. The data communication system of claim 8 further comprising means for forwarding starting headers in lieu of said synchronization headers or in lieu of said variable-length packets for the purpose of setting or changing operational parameters.

13. The data communication system of claim 8, wherein said means for computing a second CRC is replaced by means for computing a second CRC 'CRCh' encompassing said header of said $n^{th}$ packet and enough trailing bits of what is preceding said $n^{th}$ packet to spoof preceding said first CRC if said first CRC is not provided.

14. The data communication system of claim 8, wherein means for computing a first CRC is replaced by re-using any CRC belonging to protocols transported by said users' data.

* * * * *